United States Patent [19]

Ishii et al.

[11] 4,342,056
[45] Jul. 27, 1982

[54] INFORMATION BLOCK LOCATING DEVICE

[75] Inventors: Shouichi Ishii, Warabi; Masanobu Shimanuki; Akira Morizono, both of Yokohama, all of Japan

[73] Assignee: Tokyo Shibaura Denki Kabushiki Kaisha, Japan

[21] Appl. No.: 119,996

[22] Filed: Feb. 8, 1980

[30] Foreign Application Priority Data

Feb. 14, 1979 [JP] Japan ................. 54-15664
Feb. 14, 1979 [JP] Japan ................. 54-15665
Feb. 14, 1979 [JP] Japan ................. 54-17496[U]
Feb. 14, 1979 [JP] Japan ................. 54-17497[U]

[51] Int. Cl.³ ............... G11B 15/16; G17B 27/22
[52] U.S. Cl. .................. 360/72.1; 360/74.4
[58] Field of Search ........... 360/72.1, 72.2, 74.4, 360/71, 137

[56] References Cited

U.S. PATENT DOCUMENTS

Re. 30,416  10/1980  Yasunaga ................. 360/74.4
3,541,271   11/1970  Joslow et al. ............ 360/71
3,609,251    9/1971  Ban ..................... 360/72.1
4,224,644    9/1980  Lewis et al. ............ 360/74.4
4,237,497   12/1980  Trevithick .............. 360/72.1
4,241,364   12/1980  Shiga ................... 360/72.1

OTHER PUBLICATIONS

Karl Savon, Radio Electronics, Automatic Program Search, Mar. 1977, pp. 52–53.

*Primary Examiner*—Alfred H. Eddleman
*Attorney, Agent, or Firm*—Finnegan, Henderson, Farabow, Garrett & Dunner

[57] ABSTRACT

Provided is an information block-number setting device which is suitable to a program-reproducing device designed automatically to select a predetermined information block, such as an automatic music piece-selecting device for use in a tape recorder. The information block-number setting device includes a first setting section having a plurality of setters each capable of independently designating one of consecutive informtion block-numbers and a second setting section having a setter capable of designating a specified information block-number arithmetically added to said one of said consecutive information block-numbers designated by the first setting section.

6 Claims, 5 Drawing Figures

INFORMATION BLOCK LOCATING DEVICE

This invention relates to an information block locating device which is suitable for use with a program-reproducing device which automatically selects a predetermined information block, such as an automatic music piece-selecting device for use in a tape recorder.

In recent years, the use of a radio-equipped tape recorder incorporating a radio receiver has rapidly increased. With respect to such radio-equipped tape recorder, there has been a demand for an increase in output power, high fidelity (Hi-Fi) and function.

In the field of sound instruments, however, there is a demand for a sound instrument which is capable of realizing the user's desire to participate in its acoustic effect. For this reason, a tape recorder has been provided which can reproduce and and permit the user to sing a song to the accompaniment of the muisc. In a tape recorder having such a function it is necessary to select a desired music piece among a plurality of music pieces in a tape. To this end, such a tape recorder is so designed as to permit selecting a desired music piece by means of a known quick selector or an automatic muisc piece-selecting device.

The automatic music piece-selecting device, however, must of course be able to permit the music piece selection within a specified limited spatial allowance, with the simplest possible construction and also at low cost. Further, it must also be easy to operate and reliable.

A conventional automatic music piece-selecting device is constructed to count detection signals from an unrecorded space detecting section for detecting a non-signal (blank) portion on a tape between music pieces. A desired music piece as set in a music piece-number setting section is selected. Upon receipt of a coincidence signal from a coincidence detecting section for comparing such counted value with a set value of the music piece-number setting section. Such a conventional device, however, has the drawback that the construction of its sections is complicated and its operation is troublesome. In such a conventional device, the automatic music piece-selecting operation is carried out in such a manner as first to feed the relevant tape at high speed (fast feed, reverse feed) to a desired music piece and then, when the desired music piece is arrived at, stop the high-speed feeding of the tape and change over the same to a constant-speed reproduction thereof.

The setting section of such conventional device for music piece selection includes a so-called "up-down" setting system for a setting operation performed by consecutively pushing an "up" setter and a "down" setter. There is also a so-called "one-touch" setting system for a setting operation performed by selectively setting one of a plurality of switches. Since, as a matter of course, the latter system is more convenient to use, touch (push buttons) switches are preferably provided in the number corresponding to the number of music pieces to be selected. In such conventional device, however, the spatial allowance is limited and it is impossible to provide such touch switches in a number. This means that the device has the drawback that the number of selectable music pieces is likely to be limited. Further, conventional devices may include a type setting systems which is so designed as to first set to a maximum number of selectable music pieces and displace the tape position, and then newly start the music piece-selecting operation with such music piece-selecting operation being performed repeatedly. In the device of such type, however, it is undeniable that the tape-handling operation becomes very intricate and troublesome.

Furthermore, where such conventional device is designed to include an automatic music piece-selecting function, the device is contemplated either to design it without the conventional quick selecting function or to design it so as to permit it to have both functions by the respective separate constructions therefor. In the former case, however, inconvenience occurs and in the latter the device construction becomes redundant or bulky.

For the above-mentioned reasons, there has hitherto been a demand for an automatic music piece-selecting device which is simple in construction and yet is made convenient to operate by being so constructed as to perform both the quick selecting function and the automatic music piece-selecting (generally, program-reproducing) function.

Accordingly, the object of the invention is to provide an information block-member setting device which is suitable to a compact program reproducing device such as an automatic music piece-selecting device for use in a tape recorder, which is made easy to operate by being so constructed as to have both functions of quickly selecting a desired information block and reproducing by programming operation, thus to automatically select subsequent desired information blocks.

According to the present invention, there is provided an information block-number setting device which can obtain a substantial coincidence of an unrecorded space signal obtained by subjecting to high-speed reproduction a tape recorded with a plurality of information blocks, with the preset value of a desired information block-number, thereby to change over the tape operation from the high-speed reproduction to a constant-speed reproduction, thereby to permit an automatic selection of the desired information block, comprising a setting section for setting the desired informtion block-number, which setting section includes a first-setting subsection having a plurality of setters each capable of independently designating one of consecutive information block-numbers (1), (2), ... (n) and a second setting subsection having a setter capable of designating a specified information block-number (+N) being arithmetically added to said one of said consecutive information block-numbers designated by the first setting subsection.

According to the present invention, there is further provided an information block-number setting device which comprises a plurality of preset switches each capable of independently designating one of a plurality of consecutive information block-numbers, a shift register each stage of which is preset by a corresponding one of a plurality of said preset switches, a separate preset switch capable of designating a specified information block-number being arithmetically added to said one of said consecutive information block-numbers designated by one of a plurality of said preset switches, a flip-flop cascade-connected to said shift register and preset by said preset switch, and a switching circuit for causing said shift register to repeatedly operate with said flip-flop kept in a preset condition.

There will now be described a information block-number setting device according to an embodiment of the invention by reference to the appended drawings, in which.

Figure 1:
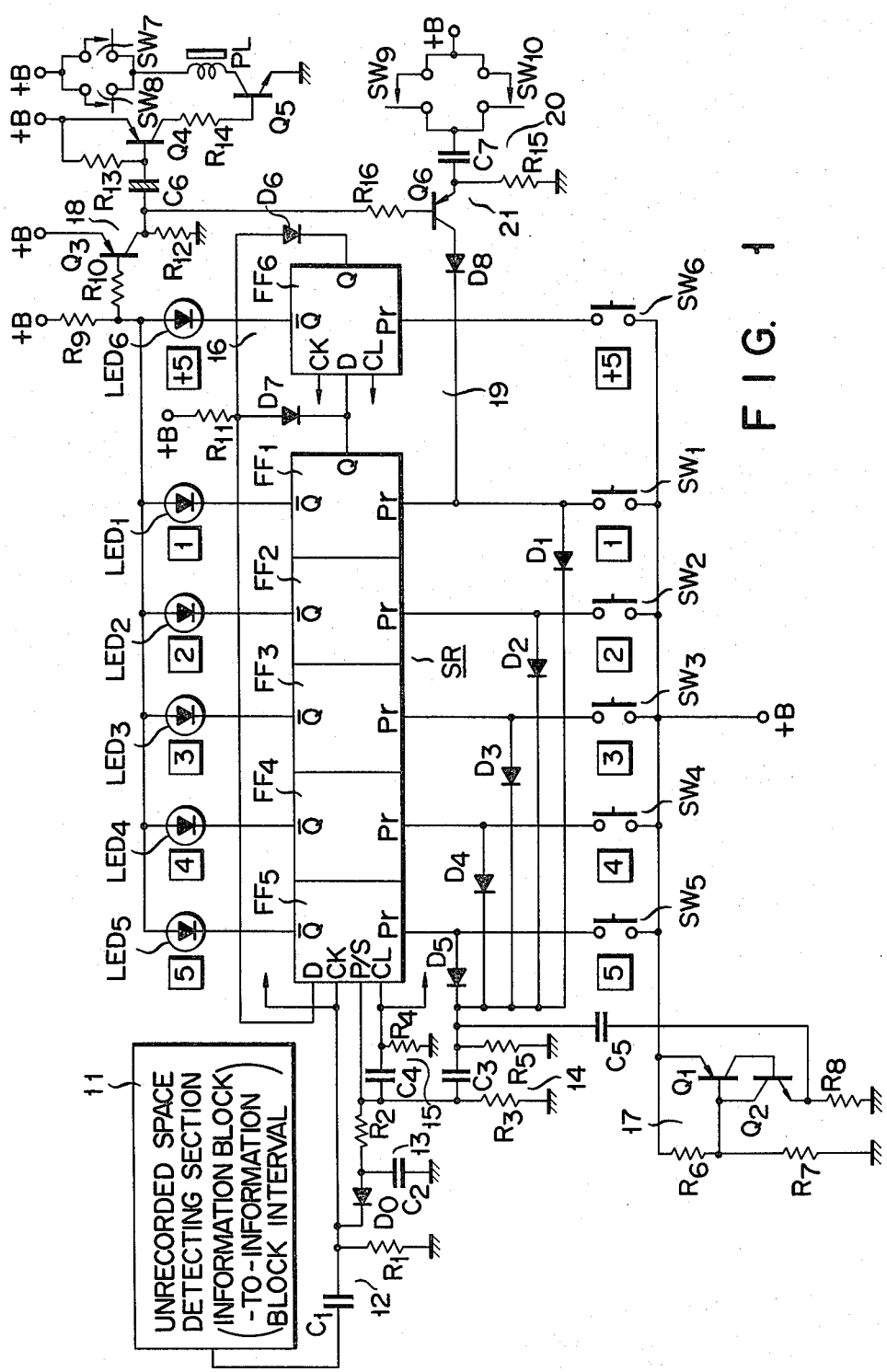
FIG. 1 is a circuit diagram illustrating the main part of an information block-number setting device according to an embodiment of the invention which is applied to a program-reproducing device for use in a tape recorder.
Figure 3:
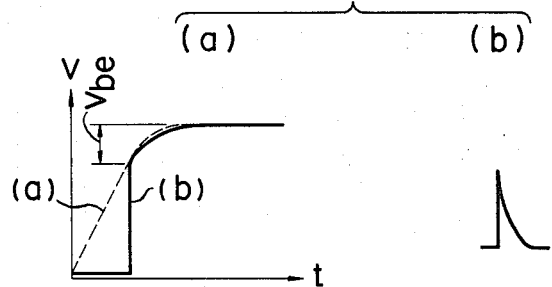
Figure 4:
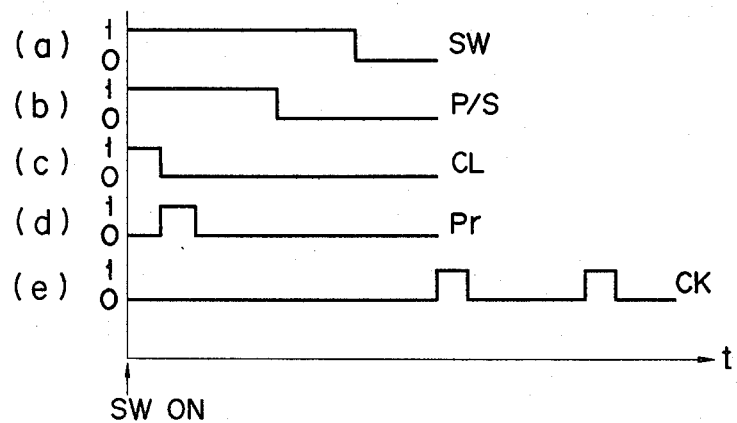

FIGS. 3(a) and 3(b) are an output-characteristic curve of an initializer circuit section of FIG. 1 and the waveform of a clear pulse obtained by differentiating the output, respecively; and FIG. 4, including (a)–(e), is a preset timing chart for explaining the operation of the preset section of FIG. 1.

There will now be explained an automatic music piece-selecting device of the subject invention which is applied to a program-reproducing device, such as a tape recorder.

In this case, the information block-number setting device is designed to count a detection signal from an unrecorded space detecting section of a tape for identifying the interval (non-signal portion) between music pieces recorded in the tape, when the tape is subjected to high-speed feed. In response to a conicidence signal from a conicidence detecting section (for obtaining a substantial coincidence by comparing the counted value with a value set in a music piece number setting section), change-over of the tape travel from the high-speed feed to a constantspeed feed is achieved so as to permit an automatic selection, for reproduction, of a music piece number designated in a music piece number setting section. The information block number setting device is further so designed that the music piece number setting section has a first setting subsection having five seters each capable of independently dsignating one of the consecutive music piece (information block) numbers 1, 2, 3, 4, and 5, and a second setting subsection having a setter capable of designating a desired music piece number, for example, +5 being arithmetically added, as required, to a music piece number designated by the first setting subsection. Thus, the information block-number setting section is designed to arbitrarily set ten music piece numbers in all prepared in such a manner as 1 to 5, 1+5=6, 2+5=7, ... 5+5=10.

Namely, the program-reproducing device generally is designed (1) to obtain a substantial coincidence of an unrecorded space signal prepared by high-speed reproduction of a tape including a plurality of information blocks, with the set value of a desired information block-number as previously set, and (2) to change-over the tape operation mode from high-speed reproduction to a constant-speed reproduction, in response to this coincidence thereby to permit an automatic selection and reproduction of the desired information block. The device is further so designed that its desired information block-number setting section has a first setting subsection having a plurality of setters each capable of independently designating one of consecutive information block-numbers of 1, 2, ... n and a second setting subsection having a setter capable of designating a specified information block-number +N being added arithmetically, as required, to said one of said consecutive information block-numbers designated by the first setting subsection. Thus, the device is designed to arbitrarily set the information block-number of 1, 2, ... n, 1+N, 2+N, ... n+N. Thus, the device permits the setting of the largest possible information block-numbers by the smallest possible numbers of setters, in which respect the characterizing feature of the invention resides.

Referring now to FIG. 1, numeral 11 designates an unrecorded space detecting section for detecting, for example, a non-signal portion between music pieces as recorded, from a reproducing section of the relevant tape recorder. Usually, the unrecorded space detecting section 11 includes a saturated amplifier, rectifier, and a Schmidt circuit, whereby to produce a pulse-shaped signal for each interval between music pieces (information blocks). An output terminal of the detecting section 11 is connected to a clock terminal CK of a 5-bit shift register SR as later described via a differentiation circuit 12 comprised of a capacitor $C_1$ and a resistor $R_1$. The output terminal of the detecting section 11 is also connected to a parallel/serial change-over terminal P/S of the said shift register SR via a preset delay circuit 13 comprised of a capacitor $C_2$ and a resistor $R_2$ and via a diode $D_0$ of the illustrated polarity.

The 5-bit shift register SR is comprised of five cascade-connected flip-flop stages $FF_5$ to $FF_1$. For brevity, however, these flip-flops are herein handled as an integral IC version. In FIG. 1, therefore, the input terminal D, clock terminal CK, parallel/serial changeover terminal P/S, and clear terminal CL of the IC version are shown only at the first stage portion $FF_5$, while a positive-phase-sequence output terminal Q thereof is shown only at the final stage portion $FF_1$.

The shift register SR has a parallel mode at the time of being preset at which its parallel/serial change-over terminal P/S has a voltage signal of high level H, and on the other hand has a serial mode at the time of counting at which its said terminal P/S has a signal of low level L.

To a respective preset terminal Pr of the flip-flop stages $FF_5$ to $FF_1$ of the shift register SR is connected a corresponding one end of each of preset switches $SW_5$ to $SW_1$ for respectively permitting designation of the consecutive numbers 5 to 1. Further, to said respective preset terminal Pr is correspondingly connected the anode of each of diodes $D_5$ to $D_1$. The other end of each of the preset switches $SW_5$ to $SW_1$ is connected to a common power source +B. The cathodes of the diodes $D_5$ to $D_1$, are commonly connected together, and, are connected at their comman point to the parallel/serial change-over terminal P/S of the shift register SR via a differentiation circuit 14 comprised of a capacitor $C_3$ and a resistor $R_3$. Said cathodes are also connected to the clear terminal CL of the shift register SR via a differentiation circuit 15 comprised of a capacitor $C_4$ and a resistor $R_4$. To the common cathode of the diodes $D_5$ to $D_1$ is connected an output terminal of an initializer 17 as later described via a coupling circuit comprised of a capacitor $C_5$ and a resistor $R_5$.

The initializer circuit 17 includes bias resistors $R_6$ to $R_8$ between the power supply +B and a ground, and an NPN transistor $Q_1$ and PNP transistor $Q_2$ subjected to a socalled PNPN connection or a "SCR connection"

To the negative-phase-sequence output terminal $\overline{Q}$ of each of the flip-flop stages $FF_5$ to $FF_1$ of the shift register SR is connected to a corresponding one of cathodes of light-emitting diodes $LED_5$ to $LED_1$ for respectively permitting display of the consecutive numbers 5 to 1.

The positive-phase-sequence output terminal Q of the final flip-flop stage $FF_1$ of the shift register SR is connected to an input terminal D of a flip-flop $FF_6$. The flip-flop $FF_6$ has a preset terminal Pr to which is connected one end of a preset switch $SW_6$ capable of designating a specified number +5 being arithmetically added to any one of the consecutive numbers ⑤ to ①
designated by the preset switches $SW_5$ to $SW_1$. The
flip-flop $FF_6$ also has a negative-phase-sequence output
terminal Q to which is connected the cathode of a light-
emitting diode $LED_6$ capable of displaying the specified
music piece number +⑤.

The other end of the preset switch $SW_6$ is connected
to the power supply +B commonly to said respective
other ends of the preset switches $SW_5$ to $SW_1$. The
anode of the light-emitting diode $LED_6$ is connected to
the power supply +B via a resistor $R_9$, in common with
the respective anodes of the light-emitting diodes
$LED_5$ to $LED_1$, and is also connected to the input ter-
minal of a comparator driving circuit 18 as later de-
scribed via a resistor $R_{10}$.

To the output terminal Q and input terminal D
(which corresponds to Q of the flip-flop $FF_1$) of the
flip-flop $FF_6$ are connected the cathodes of diodes $D_6$
and $D_7$, respectively, the anodes of which are com-
monly connected to the power supply +B via a resistor
$R_{11}$. Thus, the flip-flop $FF_6$, jointly with a switching
circuit 16 comprised of diodes $D_6$ and $D_7$ fed back di-
rectly to the input terminal D of the first flip-flop stage
$FF_5$ of the shift register SR, constitutes a repetition
command section 19 for commanding a repetitive oper-
ation to the shift register SR.

The above-mentioned comparator driving circuit 18
comprises a transistor $Q_3$ in which the base is connected
to the resistor $R_{10}$, the emitter is connected to the
power supply +B, and the collector is grounded via a
resistor $R_{12}$, a transistor $Q_4$ in which the base is con-
nected to the collector of the transistor $Q_3$ via a capaci-
tor $C_6$, the emitter is connected to the power supply
+B, and a resistor $R_{13}$ is connected between the emitter
and base; and a transistor $Q_5$ in which the base is con-
nected to the collector of the transistor $Q_4$ via a resistor
$R_{14}$, the emitter is grounded, and the collector is con-
nected to the power supply via a coil of a plunger PL
and leaf switches $SW_7$ and $SW_8$ electrically interlocked
with a high-speed operating section for fast feed and
reverse feed provided inside the tape recorder mecha-
nism. A movable iron core of the plunger PL is con-
nected, as later described, to the high-speed operating
section (fast feed and reverse feed) in the tape recorder
mechanism. The iron core serves to make the high-
speed operating section inoperative during a period a
reproduction in which the tape recorder is in operation.

$SW_9$ and $SW_{10}$ in FIG. 1 are leaf switches which are
electrically interlocked with the high-speed operating
section for fast feed and reverse feed provided inside the
tape recorder mechanism. A respective one end of the
leaf switches $SW_9$ and $SW_{10}$ is commonly connected to
the power supply +B and the respective other ends
thereof are connected to the emitter of a transistor $Q_6$
constituting priority-preset circuit 21 via a differentia-
tion circuit 20 comprised of a capacitor $C_7$ and a resistor
$R_{15}$. The transistor $Q_6$ has its collector connected to a
preset terminal Pr of the final flip-flop stage $FF_1$ in the
shift register SR via a diode $D_8$ of the illustrated polar-
ity and has its base connected to the collector of the
transistor $Q_3$ of the comparator driving circuit 18 via a
resistor $R_{16}$. In this case, the priority-preset circuit 21, if
as later described there is no music piece-number desig-
nation for the presetting operation for automatic selec-
tion of a music piece, will make a number-designation of
①.

Note here that a clock terminal CK and a clear termi-
nal CL of the flip-flop $FF_6$ are connected in parallel to
the corresponding terminals CK and CL of the first
flip-flop stage $FF_5$ in the shift register SR, respectively.

Figure 2:
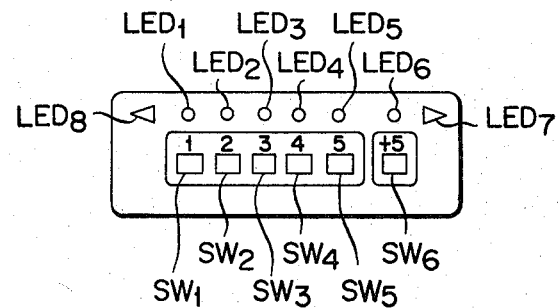
FIG. 2 is a plan view illustrating an actually-mounted example of a preset section of FIG. 1.

FIG. 2 shows an actually-mounted example of the
preset switches $SW_1$ to $SW_5$ for designation of ① to ⑤
and +⑤ and the light-emitting diodes $LED_1$ to
$LED_6$ for display thereof. Note that in FIG. 2 $LED_7$
and $LED_8$ are light-emitting diodes for displaying "nor-
mal" and "reverse" of the tape travel direction.

There will now be described the operation of the
automatic music piece-selecting device having the fore-
going construction. A tape recorder having this type of
device has a plurality of operating members which are
lockable in their actuated positions for a specified per-
iod of time, and has a locking mechanism for keeping
only one of such specified operating members actuated
with the remaining members released from actuation.

That is to say, in such type of tape recorder, a repro-
ducing member is initially actuated for automatic selec-
tion of a music piece (in the case of a radio-equipped
tape recorder this actuation is made after a power
switch is turned on and then a function switch is set to
a tape operation mode). A predetermined power volt-
age is thereby applied to the power supply +B,
whereby the presetting operation for automatic music
piece selection, i.e., desired-music piece number desig-
nating operation, is performed.

If, in that case, we are previously aware of a repro-
duction starting position of the tape prior to such repro-
ducing operation, we can at once commence the preset-
ting operation for automatic music piece selection. Usu-
ally, however, the tape is in a given wound condition
and so we are previously unaware of the reproduction
starting position of the tape. In such a case, if the preset-
ting operation is commenced after causing the repro-
duction of the tape to continue for a while and thereby
confirming the current contents of the tape, it will be
convenient.

Namely, the presetting operation may be carried out
in such a manner as to confirm after or before how
many music pieces from the current melody of the tape
a desired music piece is located and then selectively
operate one of the preset switches $SW_1$ to $SW_6$ which
corresponds to the number of music pieces up to the
desired music piece. If in this case the desired music
piece number is one of 1 to 5, we have only to select a
corresponding one of the preset switches $SW_1$ to $SW_5$
capable of independently designating one of the consec-
utive numbers ① to ⑤. If, however, the desired
music piece number is one of 6 to 10, we need operate
the preset switch $SW_6$ capable of designating a specified
number +⑤ in the sense that we arithmetically add 5
to any one of the consecutive numbers ⑤ to ① desig-
nated by said one of the present switches $SW_1$ to $SW_5$.
Thus, designation is made of 6 to 10 in such a manner as
1+5=6, 2+5=7, 3+5=8, 4+5=9 and 5+5=10.

Reference will now be made, as an example, to the
designation of the third music piece and eighth music
piece.

First, in the case of designating the third music piece,
we operate the preset switch $SW_3$ for ③ correspond-
ing to the third music piece. Thus, a power source volt-
age of +B is supplied to the preset terminal Pr of the
third flip-flop stage $FF_3$ of the shift register SR,
whereby the third flip-flop stage $FF_3$ is preset. At this
time, the negative-phase-sequence output terminal Q of
the third flip-flop stage $FF_3$ has a voltage signal of low
level, with the result that the light-emitting diode
$LED_3$ for display of ③ is driven to display that the third flip-flop stage $FF_3$ has been preset to ③, i.e., the third music piece.

Then, the tape recorder is set by actuating its fast feed operating member to a high-speed feeding operation with the reproducing member kept actuated. The reason for this is that in the usual fast-feed condition the head is retreated, failing to reproduce a tape signal for detecting the unrecorded space.

By setting the tape recorder as such, the above-mentioned pulse-shaped signal is produced, for each unrecorded space of the tape, from the unrecorded space (non-signal portion) detecting section 11. This pulse-shaped signal is first wave-shaped by the differentiation circuit 12 and then is applied to the clock terminal CK of the shift register SR. As mentioned earlier, the shift register SR has a parallel mode at the time of being preset and a serial mode at the time of counting (the controlling operation for this will be described later). Therefore, each time the unrecorded space signal is applied from the section 11 to the shift register SR, the contents of the third flip-flop stage $FF_3$ as preset are shifted to the next flip-flop stage. Namely, in this case, upon receipt of a first unrecorded space signal by the shift register SR, the contents of the third flip-flop stage $FF_3$ are shifted to the fourth flip-flop stage $FF_2$, and upon receipt of a second unrecorded space signal by the shift register SR, the contents of the fourth flip-flop stage $FF_2$ are shifted to the fifth flip-flop stage $FF_1$.

Following the above operation, the light-emitting diode $LED_3$ for display of ③ is extinguished and at the same time the light-emitting diode $LED_2$ for display of ② is lighted. Subsequently, the light-emitting diode $LED_2$ for display of ② is extinguished and at the same time the light-emitting diode $LED_1$ for display of ① is lighted. In this way, display is made of the state of music piece shift (up to a desired music piece).

And when a third unrecorded space signal is applied to the shift register SR, the contents of the fifth flip-flop stage $FF_1$ are inverted, whereby the light-emitting diode $LED_1$ for display of ① is extinguished. At this time, the operation mode in which any one of the foregoing light-emitting diodes has therefore been lighted after the shift register was preset, is changed to an operation mode in which all of such diodes are extinguished. As a result, the comparator driving circuit 18 starts to operate. Note here that the flip-flop stage $FF_6$ is not operated whatsoever due to the operation of the switching circuit 16 comprised of the diodes $D_6$ and $D_7$ as later described.

The operation of the comparator driving circuit 18 is as follows. As mentioned above, any one of the light-emitting diodes has been lighted until application of said third unrecorded space signal to the shift register SR, and the transistor $Q_3$, until that time, is kept in an "on" state by the diode driving current. The transistor $Q_3$, however, is turned off when, as mentioned above, all the diodes have been brought into extinguishment. Then, the transistor $Q_4$ operating responsive to the transistor $Q_3$ is brought to an "on" state from the "off" state with a result that the transistor $Q_5$ is also brought to an "on" state. Thus, the plunger PL connected to the collector circuit of the transistor $Q_5$ is energized via the lead switch $SW_7$ which is then kept closed. Thus, the movable iron core of the plunger PL operates to make the high-speed operating section alone of the tape recorder mechanism inoperative, thereby to stop the high-speed feed thereof and change it over to a reproduction mode.

Thus, the third music piece as initially preset comes to be reproduced. In this way, the automatic desired music piece-selecting (reproducing) operation becomes possible.

Where it is desired to designate the eighth music piece, we have only to first operate the preset switch $SW_3$ for ③ and then operate the preset switch $SW_6$ for ⊞⑤. This is because, if we first operate the preset switch $SW_6$ for ⊞⑤, the preset state of $FF_6$ of the shift register SR is cleared at the time of operation of $SW_3$. (This is also true of the other cases.)

In the case of designating the eighth music piece, the ③ preset state of the shift register SR and the process of automatic music piece-selecting operation based upon the presetting of ③ are the same as mentioned above except for the only difference that the light-emitting diode $LED_6$ for display of ⊞⑤ is lighted at the same time as the preset switch $SW_6$ ⊞⑤ is preset.

In that case, when such a second unrecorded space signal as stated before in the course of automatic music piece-selecting operation has been applied to the shift register SR, the positive-phase-sequence output terminals Q of $FF_1$ and $FF_6$ each have a voltage signal of high level, and thus the diode switches $D_6$ and $D_7$ of the switching circuit 16 at least one of which has theretofore been kept in an "on" state are both turned off. As a result, the voltage of the power supply +B is applied to the input terminal D of the shift register SR and upon application of a third unrecorded space signal thereto, the contents of $FF_1$ are shifted to $FF_6$. During the period between the applications of said second and third unrecorded space signals to the shift register SR, the light-emitting diode $LED_1$ for ① is extinguished and the light-emitting diode $LED_6$ alone is lighted to display the state of music piece shift that five music pieces are left until reaching a desired music piece. Upon application of said third unrecorded space signal to the shift register SR, the contents of $FF_6$ are inverted. As a result, though the display of ⊞⑤ itself is extinguished, yet the light-emitting diode $LED_5$ for display of ⑤ is lighted with a result that the automatic music piece-selecting operation is allowed to continue.

The above operation is due to the reason that, as stated before, the input terminal D of the initial flip-flop stage $FF_5$ of the shift register SR is supplied with a high-level signal based upon the application of the +B voltage to terminal D due to the operation of the switching circuit 16 comprised of the diodes $D_6$ and $D_7$. Namely, said operation is due to the performance, in that case, of a function equivalent to a ring-counter-like circulating function performed such that the contents of the shift register SR are fed from $FF_6$ back to $FF_5$.

Further, upon receipt of a fourth unrecorded space signal by the shift register SR, the contents thereof are shifted from $FF_5$ to $FF_4$ and, upon receipt of a fifth unrecorded space signal by the shift register SR, the contents thereof are shifted from $FF_4$ to $FF_3$. Similarly, upon receipt of a sixth and a seventh unrecorded space signal, the contents of the shift register SR are shifted in such a manner as $FF_3 \rightarrow FF_2 \rightarrow FF_1$. Upon receipt of an eighth signal by the shift register SR, the contents of $FF_1$ are inverted. Thereafter, in the same manner as mentioned before all of the light-emitting diodes are extinguished to cause the comparator driving circuit 18 to operate, whereby the automatic eighth-music piece selecting (reproducing) operation is carried out.

In this case, however, since the positive-phase-sequence output terminal Q has a low-level voltage signal with the contents of $FF_6$ kept in an inverted state, the above-mentioned ring-counter like circulating function due to the operation of the switching circuit 16 is prevented from being performed.

Also in the case of designating other music piece numbers 1, 2, 4, 5, 6, 7, 9 and 10 than said third and eighth music piece numbers it will be apparent that the same explanation as that for the automatic third and eighth music piece reproducing operation is applicable.

The foregoing explanation has referred to the automatic music piece-selecting operation which is to be performed where a desired music piece is located at a position immediately succeeding to some music pieces taken from the current music piece position of the tape in a direction opposite to the forward travel direction thereof. Such explanation, however, similarly applies to the automatic music piece-selecting operation which is to be performed in the case where a desired music piece is located at a position immediately preceding some music pieces taken from the current music piece position of the tape in a direction opposite to the reverse travel direction thereof. In the latter case, however, since an unrecorded space signal is detected at its rising portion, i.e., at a starting portion of the current music piece (in the former case, at its falling portion, i.e., an ending portion of the current music piece), it is necessary to set to a music piece number obtained by adding 1 to a desired-music piece number. Namely, since in this latter case the first unrecorded space signal is obtained at a starting portion of the current music piece, when designating, for example, a music piece immediately preceding to that current music piece, we need to set to a music piece number $(1+1)=2$. Only by so doing, does it becomes possible to set the tape to the reproduction of that music piece from its starting portion.

In the said former case, since an unrecorded space signal obtained at an ending portion of the current music piece is equivalent to that obtained at a starting portion of the immediately succeeding music piece to that current music piece, we have only to set a desired-music piece number as it stands without making such an amendment as stated in the said latter case.

Where a desired-music piece number is 11, 12, . . . , we have only to first set the tape to, for example, the tenth music piece and then, at the time when this tenth music piece has come out, set it again to the number of the remaining music pieces (1, 2, 3, . . . or 9). Usually, however, in most cases, the tape is only recorded with seven music pieces for each side. The setting of the tape in the above way, therefore, will not be required.

In the case of, however, reproducing a tape recorded with an appreciably large number of music pieces exceeding around fourteen music pieces, it is required to provide a plurality of preset sections capable of designating specified music piece numbers +5 (+N), +10 (+N'), . . . in the sense that we arithmetically add such numbers to the consecutive-number designating preset sections. Accordingly, from the sixth music piece to the tenth the preset section for ⊞5 is used; from the eleventh music piece to the fifteenth the preset section for ⊞10 is used, and from the sixteenth music piece to the twentieth both preset sections for ⊞5 and ⊞10 are used together. Thus, up to the twentieth music piece the presetting can be effected by one presetting operation.

If as in the above-mentioned example of n=5, +N=5 arrangement is made such that n=N, it will often be convent in respect of presetting 1, 2, . . . or 10 by one presetting operation. Further, if arrangement is made such that $N'=2N(=10)$, it will also give us convenience in presetting 1, 2, . . . or 20. The present invention, however, is not limited to such arrangements but permits any given arrangement such as 1~n, +N, +N', +N", . . . .

We will now explain the operation of the priority reproducing member without the above-mentioned presetting operation for automatic music piece selection. The reason for this is that in such a case it is convenient to make an arrangement so as to render the usual (one melody) cuing function effective.

Namely, when actuating the fast-feeding or reverse-feeding member immediately after the actuation of the reproducing member without executing the presetting operation for automatic music piece selection, the transistor $Q_6$ is instantaneously turned on via either one of the leaf switches $SW_9$ and $SW_{10}$ and the differentiation circuit 20. Therefore, a preset pulse is applied to the preset terminal Pr of the fifth flip-flop stage $FF_1$ of the shift register SR. Thus, the light-emitting diode $LED_1$ for display ⊡ is lighted and, when a first unrecorded space signal is applied to the shift register SR, the ligt-emitting diode $LED_1$ is extinguished in the same manner as stated before. Thus, the tape is changed over from the state of high-speed travel to the state of reproduction. Thus, the so-called (one melody) cuing function can be executed. Where having actuated the reverse-feeding member, a so-called review function is performed, for the same reason as mentioned before, in which reproduction is effected from the starting portion of the current music piece of the tape. Therefore, where it is strongly desired to reproduce the tape from the top of a music piece immediately preceding the current music piece of the tape, we have only to again actuate the reverse-feeding member.

The time when the priority preset circuit 21 is automatically preset to ⊡ as mentioned above is only prior to the execution of the presetting operation for automatic music piece selection. After such presetting operation has already been executed, such automatic presetting of the priority preset circuit 21 is prohibited by the transistor $Q_6$ rendered ineffective. This is because the base potential of the transistor $Q_6$ is the emitter potential of the transistor $Q_3$ in the comparator driving circuit 18 and yet, if such presetting operation has already been executed whereby any one of the light-emitting diodes is lighted, the transistor $Q_3$ is kept in an "on" state, so that the base of the transistor $Q_6$ is reversely-biased by the emitter potential of the transistor $Q_3$. In other words, since, prior to the execution of such presetting operation, the transistor $Q_3$ is kept in an "off" state, the base of the transistor $Q_6$ is kept forwardly-biased. For this reason, it becomes possible that the priority preset circuit 21 is preset to ⊡ by the fast-feeding or reverse-feeding as stated before.

Reference will now be made to the various circuits operations which permit a smooth execution of the foregoing automatic music piece-selecting operation without any confusion and any erroneous operation.

First, the initializer 17 is provided for the purpose of eliminating the inconvenience which can occur due to a gentle rise of the power source voltage at the time when the power is supplied. That is to say, the respective flip-flops $FF_1$ to $FF_6$ of the to-be-preset section are all required to be cleared immediately after the closure of the power source, whereby all of the light-emitting diodes $LED_1$ to $LED_6$ are extinguished, whereby said to-be-preset section is kept waiting to be preset.

If it is assumed, however, that such initializer 17 is not employed, since the power source voltage indicates a gentle rise, the conditions of the respective flip-flops become non-uniform to give rise to the inconvenience that they fail to be immediately and uniformly cleared. The initializer circuit 17 is therefore intended to convert a gently rising power source voltage into a sharp pulse by the operation of the NPN transistor $Q_1$ and PNP transistor $Q_2$ which are subjected to a four-layer PNPN connection (so-called SCR connection). By using that pulse as a clear pulse the above inconvenience can be removed. Namely, the NPN and PNP transistors $Q_1$ and $Q_2$ subjected to the four-layer PNPN connection, as shown in FIG. 3(a), have a vertically rising output characteristic (b) as indicated by an illustrated solid line, in contrast to such a gently rising power source voltage characteristic (a) as indicated by an illustrated broken line. Morever, the trigger level of that output characteristic (b) is determined by the base voltage $V_{be}$ of the PNP transistor $Q_1$. FIG. 3(b) shows the waveform of that output of the initializer circuit 17 which has been converted by the differentiation circuit 15 into a clear pulse. Thus, when this clear pulse is supplied, at the time of closing the power source, to the respective clear terminals CL of the flip-flops $FF_1$ to $FF_6$, it can perform a stable initialized clearing function.

Secondly, the clearing operation which follows the presetting operation is carried out through the diodes $D_1$ to $D_5$ connected between the preset switches $SW_1$ to $SW_5$ and the clear terminals CL of the flip-flops $FF_1$ to $FF_5$. Namely, when operating one of the preset switches (which excludes the preset switch $SW_6$ as later described), a clear pulse is given, via any one diode, to the flip-flops excluding one which corresponds to that one of the preset switches.

Thus, where it is desired to correct the once preset value, this value can be cleared simply by again setting a desired value without need to provide an exclusive clear switch.

The reason why at the time of operating the preset switch $SW_6$ +5 it is necessary to do so after operating any one of the preset switches for 1 to 5 as stated earlier is due to the necessity to enable the above clear operation. Namely, said reason is that if we operate any one of the preset switches $SW_1$ to $SW_5$ for 1 to 5 after operating the preset switch $SW_6$ for 5 , the preset value of +5 is cleared. If, on the contrary, we first operate any one of the preset switches for 1 to 5 and then operate the preset switch $SW_6$ for +5 , since a clear diode is not connected to the preset switch $SW_6$, the presetting of both any one of 1 to 5 and +5 are maintained.

The invention is preferable in that change in preset value can easily be made without providing a separate clear switch (button switch) as mentioned above.

Thirdly, the shift register SR functions, at the time of being preset, under a parallel mode and, at the time of counting, under a serial mode, as stated earlier. We will now explain the control operation for the change-over from serial to parallel or vice versa. When we operate any one of the preset switches $SW_1$ to $SW_5$, a high-level voltage signal is applied to the parallel/serial change over terminal P/S of the shift register via any corresponding one of the diodes $D_1$ to $D_5$ and the differentiation circuit 14, whereby the shift register SR is brought to a mode of parallel operation. At the time of counting at which said high-level voltage signal ceases to be applied to the shift register SR and instead a low-level voltage signal is applied thereto, the shift register SR is changed over to a mode of serial operation.

Note the following in this regard. When we have operated any one of the preset switches $SW_1$ to $SW_5$, the flip-flops $FF_1$ to $FF_6$ are initially all cleared. It is, therefore, after the passage of this clear period that the flip-flops $FF_1$ to $FF_5$ become able to be actually preset. Further, at the time of presetting, based upon the above-mentioned parallel/serial change-over, the shift register SR is allowed, when supplied with a high-level voltage signal, to function under a parallel mode. The actual presetting of the shift register SR should therefore be effected after it is changed over to a parallel mode.

The above-mentioned preset delay circuit 13 is for the purpose of securing the timing for such presetting of the shift register SR. The shift register SR can reliably be preset by a preset pulse which is obtained based upon the delay by the preset delay circuit 13.

FIG. 4 shows a timing chart for such presetting of the shift register SR. (a) shows the timing for operation of the preset switch, (b) the timing for the parallel/serial change-over signal produced by the preset-switch operation, (c) the timing for the clear pulse, (d) the timing for the preset pulse based upon the delay, and (e) the timing for the unrecorded space signal which becomes a clock pulse.

The present invention is not limited only to the above-mentioned and illustrated embodiment but enables various modifications to be made in sofar as no change is made in the subject matter of the invention.

For instance, in the above-mentioned embodiment the to-be-preset section is not restricted to a combined unit of the shift register SR and the flip-flop $FF_6$ but may be constituted by a counter (including a ring-counter). The point is that the tape driving mechanism has only to be changed over from the high-speed feed mode to the constant-speed feed mode by substantially comparing a set value with a counted value of unrecorded space signals. Further, the display section for the preset condition is not necessarily required to be constituted by the light-emitting diodes but may be constituted by other display elements such as lamps.

The present invention is suitably applied particularly to the automatic music piece-selecting device for use in a tape recorder. However, the recorded spaces included in the tape may be other information than music, e.g. messages or data. The invention, therefore, is widely applicable to tape-handling instruments or equipment in general.

In this case, the unrecorded space signal becomes an information block-to-information block interval signal. Detection of such information block-to-information block interval signal is not limited to that of the non-signal portion (blank portion) but may be that of a distinguishable signal block standing among the information blocks.

What we claim is:

1. In an information block locating device which responds to a substantial coincidence of an interval signal corresponding to the detection of intervals between information blocks obtained by subjecting a tape recorded with a plurality of information blocks to high-speed reproduction, with a preset value of a desired information block-number, thereby to change over the tape operation from high-speed reproduction to a normal-speed reproduction, to permit automatic location of the desired information block, the improvement comprising: a presetting section for presetting the desired information block-number, which presetting section includes a first pesetting subsection having first means for independently designating one of a plurality of consecutive information block-numbers (1), (2), . . . (n) and a second presetting subsection having second means for designating a predetermined number (+N) to be arithmetically added to said one of said consecutive information block-numbers designated by said first presetting subsection thereby to designate one of a plurality of consecutive block numbers (1+N), (2+N), . . . (n+N).

2. An information block locating device according to claim 1 wherein said first presetting subsection includes a plurality of preset switches each capable of independently designating one of the consecutive information block-numbers and a shift register each stage of which is preset by a corresponding one of a plurality of said preset switches; and said second presetting subsection includes a separate preset switch capable of designating said predetermined number (+N) to be arithmetically added to said one of said consecutive information block-numbers designated by one of a plurality of said preset switches, a flip-flop cascade-connected to said shift register and preset by said separate preset switch, and a switching circuit for repeatedly operating said shift register when said flip-flop is preset.

3. An information block locating device according to claim 1 or 2 wherein an initializer circuit consisting of a pair of transistors and a differentiation circuit is disposed between a power source and respective clear terminals of said shift register in said first presetting subsection and said flip-flop in said second presetting subsection in order to supply a sharp clear pulse to said respective terminals at the time of closing said power source, said pair of transistors being arranged in a four-layer PNPN connection to have a characteristic of converting a gently rising power source voltage into a sharp clear pulse voltage.

4. An information block locating device according to claim 1 which further comprises a priority preset circuit for precedently presetting an information block-number of 1 in said presetting section in response to a non-preset condition thereof and the actuation of high-speed reproduction of said tape.

5. An information block locating device according to claim 1 wherein said information block-number (n) capable of being designated in said first presetting subsection is selectively set to an equal relationship (n=N) to said predetermined number (+N) capable of being designated in said second presetting subsection.

6. An information block locating device according to claim 1, wherein said second presetting subsection includes a plurality of predetermined numbers (+N), (+N'), . . . capable of being arithmetically added to said one of said plurality of consecutive information block-numbers designated by said first presetting subsection.

* * * * *